(12) United States Patent
Chang

(10) Patent No.: US 8,177,175 B2
(45) Date of Patent: May 15, 2012

(54) DIGITAL MOBILE DEVICE AND STAND MODULE THEREOF

(75) Inventor: Yang-Chih Chang, Taipei County (TW)

(73) Assignee: Chenming Mold Ind. Corp., Taipei (TW)

( * ) Notice: Subject to any disclaimer, the term of this patent is extended or adjusted under 35 U.S.C. 154(b) by 329 days.

(21) Appl. No.: 12/574,932

(22) Filed: Oct. 7, 2009

(65) Prior Publication Data

US 2010/0230561 A1 Sep. 16, 2010

(30) Foreign Application Priority Data

Mar. 10, 2009 (TW) ............................... 98203674 U

(51) Int. Cl.
*F16M 11/38* (2006.01)
*G06F 1/16* (2006.01)

(52) U.S. Cl. ................. 248/168; 248/176.3; 361/679.59

(58) Field of Classification Search .................. 248/133, 248/168, 176.3, 125.1, 917–923, 170, 447, 248/454–458; 361/679.06, 679.09, 679.21, 361/679.27, 679.29, 679.55, 679.59, 681–683; 16/361, 356; 345/173; 455/575.1
See application file for complete search history.

(56) References Cited

U.S. PATENT DOCUMENTS

| | | | | |
|---|---|---|---|---|
| 6,364,124 | B1 * | 4/2002 | Chen | 211/85.1 |
| 6,768,635 | B2 * | 7/2004 | Lai et al. | 361/679.11 |
| 6,975,507 | B2 * | 12/2005 | Wang et al. | 361/679.21 |
| 7,396,233 | B2 * | 7/2008 | Lin | 248/923 |
| 7,580,248 | B2 * | 8/2009 | Ogawa et al. | 361/679.21 |
| 7,845,102 | B2 * | 12/2010 | Choi | 40/538 |
| 7,898,801 | B2 * | 3/2011 | Wang et al. | 361/679.59 |
| 7,916,478 | B2 * | 3/2011 | Tu et al. | 361/679.59 |
| 2003/0089832 | A1 * | 5/2003 | Gold | 248/454 |
| 2009/0261216 | A1 * | 10/2009 | Yang et al. | 248/168 |
| 2011/0031287 | A1 * | 2/2011 | Le Gette et al. | 248/176.3 |

* cited by examiner

*Primary Examiner* — Tan Le
(74) *Attorney, Agent, or Firm* — WPAT, P.C.; Anthony King

(57) ABSTRACT

The present invention discloses a digital mobile device and a stand module thereof. The digital mobile device includes a stand module comprising a fixing element and a rotating element. The fixing element is disposed on a side of the digital mobile device and includes an elastic element and a positioning member. The positioning member is disposed on a side of the elastic element. The rotating element is pivotally connected to the fixing element and has a positioning hole. The elastic element and the positioning member are disposed in the positioning hole. If the rotating element is rotated with respect to the fixing element, the elastic element will compress the positioning member to abut the fixing element, such that the fixing element and the rotating element are maintained at a positioning angle.

24 Claims, 5 Drawing Sheets

DIGITAL MOBILE DEVICE AND STAND MODULE THEREOF

BACKGROUND OF THE INVENTION

1. Field of the Invention

The present invention relates to a digital mobile device and a stand module thereof, in particular to a stand module capable of securely supporting a digital mobile device at a predetermined angle.

2. Description of the Related Art

As mobile communication devices become popular, and manufacturers develop and manufacture mobile communication devices with diversified functions to gain a larger market share, and thus the mobile communication devices not only provide diversified value-added functions including multimedia, wireless network, game and conference call to satisfy consumer requirements, but also come with a stylish appearance to provide a greater appeal to consumers' purchasing desires.

With reference to FIG. 1 for a schematic view of a conventional mobile communication device, the mobile communication device includes a body 10, a front casing 101 and a rear casing 102, wherein the front casing 101 and the rear casing 102 are disposed at the front and rear sides of the body 10 respectively, and the front casing 101 includes a display screen 103 and an operation keyboard 104. When a general mobile communication device is laid on a table top flatly, the viewing angle of the display screen 103 usually covers 135 degrees only and may cause the reflection of light, such that if a user's vision is out of the range of the viewing angle of the display screen 103, the user will be unable to see the caller ID number and time on the display screen clearly. Furthermore, if the mobile communication device is playing audio or video information, the user has to hold the mobile communication device for an adjustment to the best viewing angle in order to view the display information on the display screen more clearly.

In view of the aforementioned issue, some manufacturers produce an accessory such as a mobile phone holder to give a greater appeal to consumers' desires to purchase the mobile phone holder in order to overcome the issue of unable to place the mobile phone or view the display screen of the mobile phone easily.

However, a general mobile phone holder provides a function of placing the mobile phone, but users find that it is inconvenient to carry the holder together with the mobile communication device.

As to present popular mobile communication devices with a photographic function, such devices will be appealing to consumers if a digital camera with a function of positioning a stand is provided. Thus, the manufacturers start to manufacture mini stands with the same structure of a general camera stand to cope with the market requirement. Since it is necessary to carry the stand and some of the stands are larger than the mobile communication device itself, therefore not too many consumers are interested in such stand.

In addition, some digital mobile devices, such as digital photo frames, come with a stand module disposed at the rear side of the frame for supporting and fixing the frame. However, such stand module are fixed to the frame simply by bolts or screws, such that if a user adjusts the rotating angle of the stand module, the stand module will be shaken easily by external forces, and thus the digital photo frame cannot be fixed securely on an operating surface and may be toppled easily.

SUMMARY OF THE INVENTION

In view of the aforementioned shortcomings of the prior art, the present invention provides a digital mobile device and a stand module thereof to achieve the objective of overcoming the shortcomings of a conventional mobile phone holder that cannot be carried easily, or a conventional stand module that cannot be maintained at a positioning angle.

To achieve the foregoing objectives, the present invention provides a stand module for supporting a digital mobile device and includes a fixing element and a rotating element. The fixing element includes an elastic element and a positioning member. The positioning member is disposed on a side of the elastic element. The rotating element is pivotally connected to the fixing element, and includes a positioning hole, and the elastic element and the positioning member are disposed into the positioning hole. If the rotating element is rotated with respect to the fixing element, the elastic element compresses the positioning member to abut the fixing element, such that the fixing element and the rotating element are maintained at a positioning angle.

The fixing element includes an engaging portion and a containing portion, and the rotating element includes a positioning portion and a pivoting portion, and the pivoting portion is embedded into the containing portion.

The fixing element further includes a pivoting element pivotally connected to the containing portion and the pivoting portion.

Since the stand module of the invention uses the elastic element to compress the positioning member to abut the fixing element, therefore users can operate the fixing element and the rotating element and use the elastic element to compress the positioning member when the user operates the stand module, and the positioning member and the fixing element produce a friction to maintain a positioning angle and provide a hand feel of the operation.

Therefore, it is a primary objective of the present invention to provide a digital mobile device comprising a stand module, wherein the stand module includes a fixing element and a rotating element. The fixing element is disposed on a side of the digital mobile device, and the fixing element includes an elastic element and a positioning member disposed on a side of the elastic element. The rotating element is pivotally connected to the fixing element, and the rotating element includes a positioning hole, an elastic element and a positioning member disposed into the positioning hole. If the rotating element is rotated with respect to the fixing element, the elastic element compresses the positioning member to abut the fixing element, such that the fixing element and the rotating element are maintained at a positioning angle.

DETAILED DESCRIPTION OF THE PREFERRED EMBODIMENTS

The technical characteristics of a digital mobile device and a stand module thereof in accordance with the present invention will become apparent from the following detailed description taken with the accompanying drawings. It is noteworthy to point out that same numerals are used for representing the same respective elements in the following embodiments.

Figure 1:
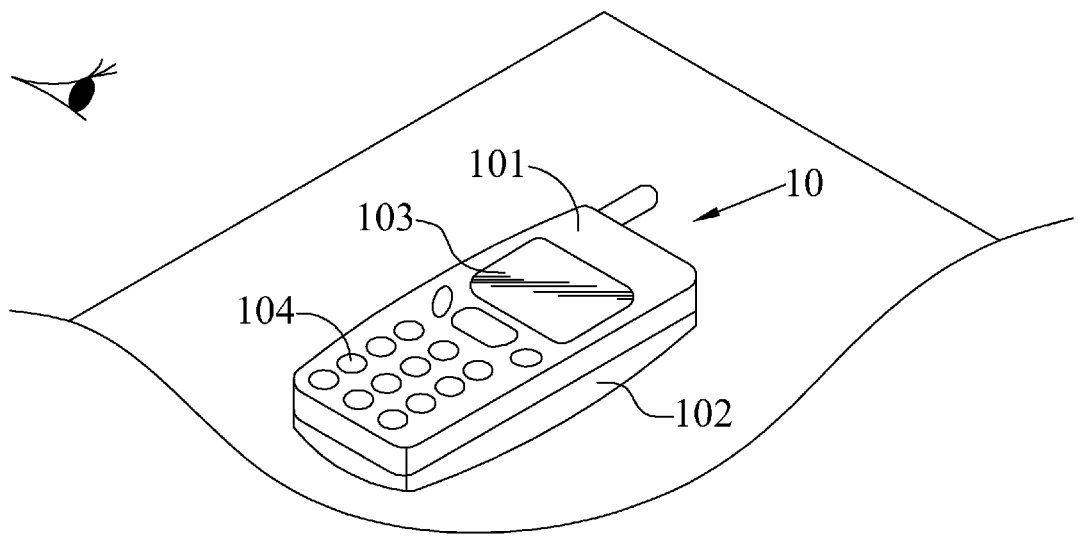
FIG. 1 is a schematic view of a conventional mobile communication device.
Figure 2:
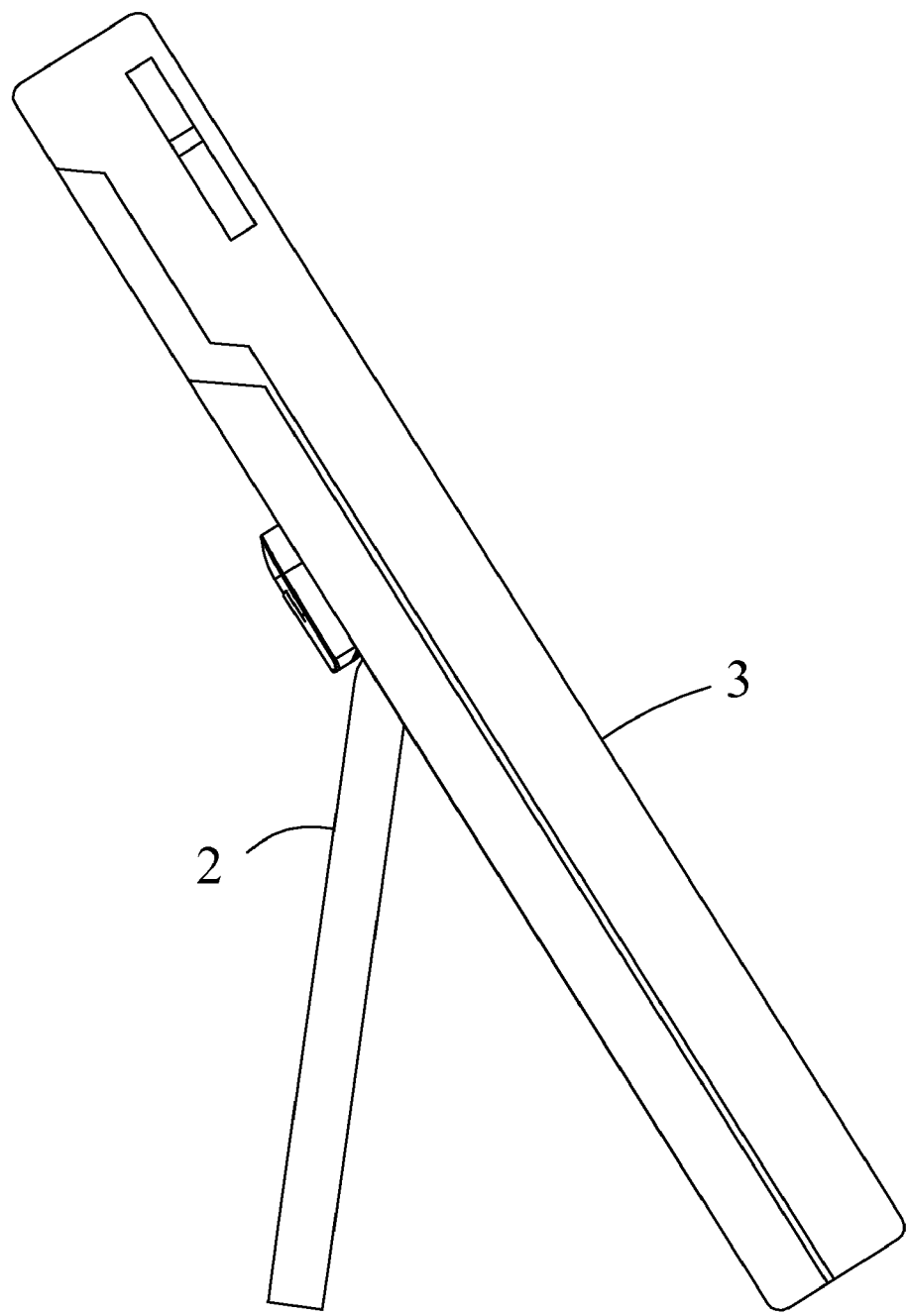
FIG. 2 is a schematic view of a digital mobile device and a stand module in accordance with the present invention.
Figure 3:
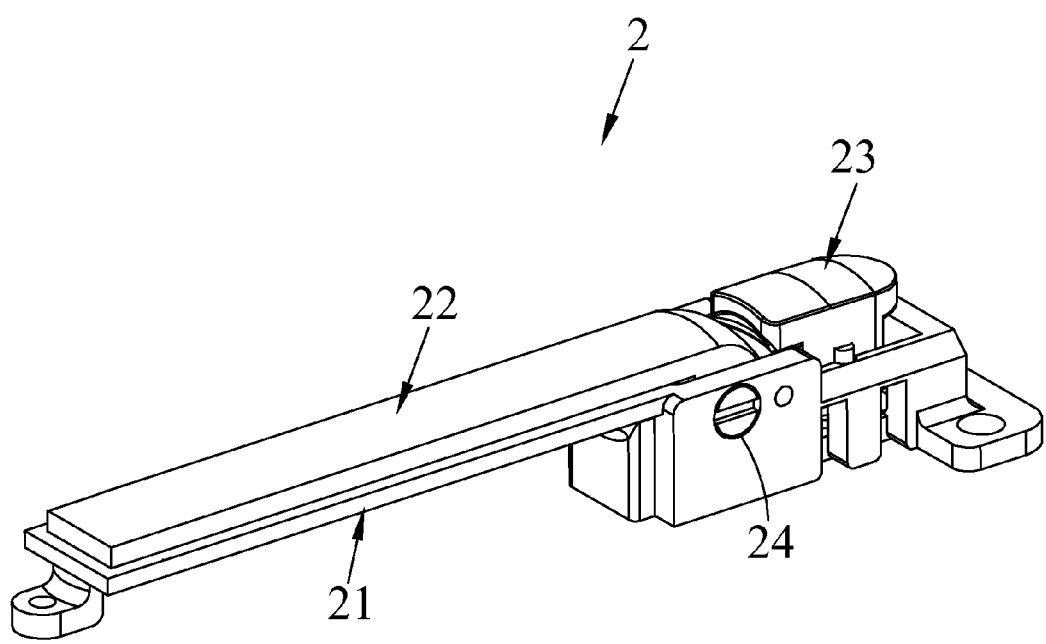
FIG. 3 is a perspective view of a digital mobile device and a stand module in accordance with the present invention.

With reference to FIGS. 2 and 3 for a schematic view and a perspective view of a stand module and a digital mobile device in accordance with a preferred embodiment of the present invention respectively, the digital mobile device 3 includes a stand module 2 comprising a fixing element 21, a rotating element 22 and a pressing element 23.

Figure 4:
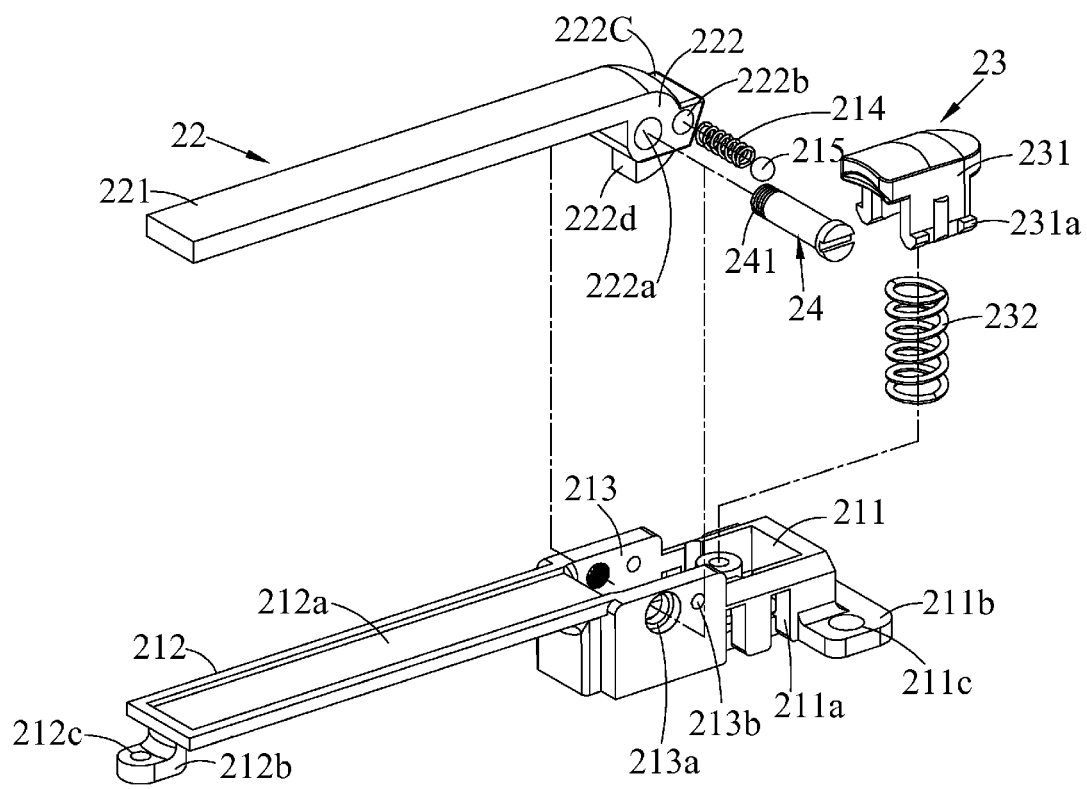
FIG. 4 is an exploded view of a digital mobile device and a stand module in accordance with the present invention.

With reference to FIG. 4 for an exploded view of a digital mobile device and a stand module in accordance with a preferred embodiment of the present invention, the fixing element 21 is a pillar and has a groove 211, an engaging portion 212, a containing portion 213, an elastic element 214 and a positioning member 215. The groove 211, the engaging portion 212 and the containing portion 213 are formed at both lateral sides and the central position of the fixing element 21. The engaging portion 212 includes a slot 212a formed at the top of the engaging portion 212, and a positioning pin 212b formed at the bottom of the engaging portion 212, and the positioning pin 212b has a hole 212c for fixing the stand module onto the digital mobile device 3. The containing portion 213 includes a first pivot hole 213a and a position limit hole 213b. A plurality of latch portions 211a are concavely disposed at an interval of a wall of the groove 211, and a positioning pin 211b is extended from the bottom. The positioning pin 211b includes a hole 211c for fixing the positioning pin 211b onto the digital mobile device 3. In this preferred embodiment, the fixing element 21 is casted and made of a metal with a low melting point such as a zinc alloy to facilitate casting and molding the fixing element 21, and the elastic element 214 may be a spring, and the positioning member 215 may be a ball made of carbon steel. However, the invention is not limited to such arrangements only.

The rotating element 22 is a pillar and includes a positioning portion 221 and a pivoting portion 222. The positioning portion 221 and the pivoting portion 222 are disposed on both sides of the rotating element 22. A side of the positioning portion 221 is embedded into the slot 212a of the engaging portion 212, and a second pivot hole 222a and a positioning hole 222b are disposed on a sidewall of the pivoting porting 222, and the top of the pivoting portion 222 forms a press plane 222c, and a stop unit 222d is protruded from the bottom of the pivoting portion 222, wherein the first pivot hole 213a and the second pivot hole 222a are provided for passing a pivoting element 24. In this preferred embodiment, the rotating element 22 can be made of a metal such as an iron-nickel alloy and processed by electroplating (such as plating nickel onto its surface) to achieve the aesthetical effect. In addition, the pivoting element 24 includes a screw portion 241 including but not limited to a bolt.

The pressing element 23 includes a pressing member 231 and an elastic member 232. The pressing member 231 is in a shape of a cover, and includes a plurality of latch pins 231a extended from the bottom of a sidewall of the pressing member 231 and corresponding to the latch portion 211a. The elastic member 232 may be a spring disposed between the pressing member 231 and the groove 211.

Figure 5:
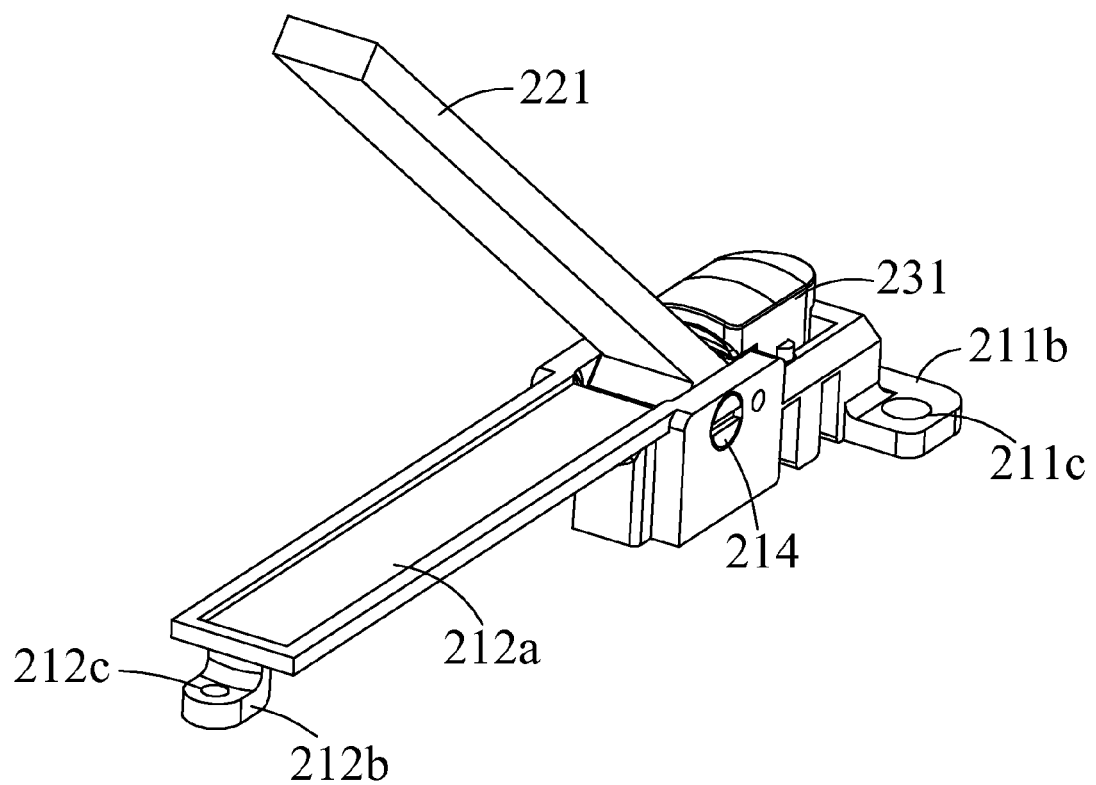
FIG. 5 is a schematic view of a stand module in a mode of supporting a digital mobile device in accordance with the present invention.

With reference to FIGS. 4 and 5, FIG. 5 shows a schematic view of a stand module in a mode of supporting a digital mobile device in accordance with the present invention. If the stand module 2 is assembled, the elastic element 214 and the positioning member 215 are disposed in the positioning hole 222b, and then the pivoting element 24 is inserted into the first pivot hole 213a and the second pivot hole 222a, and the pivoting element 24 is rotated to be screwed and fixed to the containing portion 213, and the rotating element 22 is pivotally coupled to the fixing element 211. Now, the elastic element 214 is compressed by the positioning member 215 to produce a resilience force to abut the positioning member 215, such that the positioning member 215 is latched and limited into the position limit hole 213b. Then, the pressing element 23 is disposed onto the groove 211, such that the latch pin 231a of the pressing member 231 is latched to the latch portion 211a of the groove 211, and the elastic member 232 is disposed into the groove 211. Finally, screws or bolts are passed through the holes 212c, 213b to secure the stand module 2 and digital mobile device 3.

If a user wants to view a movie or a caller ID played from the digital mobile device 3, the user can switch the folded stand module 2 into an unfolded state to support the digital mobile device 3. When the user operates the stand module 2, the user presses the pressing member 231 to force the press plane 222c of the pivoting portion 222 and the elastic member 232, such that the elastic member 232 is compressed to store an elastic potential energy, and the positioning member 215 is separated from the position limit hole. Since the press plane 222c of the pivoting portion 222 is abutted by the pressing member 231 to move downward and drive another end of the pivoting portion 222 to use the pivoting element 24 as a fulcrum to move and rotate upward, therefore the positioning portion 221 is warped outward by approximately 20 degrees in a direction away from the engaging portion 212. The positioning portion 221 is rotated further in a direction away from the engaging portion 212. If the angles of the rotating element 22 and the fixing element 21 are approximately 80 degrees, the stop unit 222d will abut the containing portion 213 to limit the maximum open angle of the rotating element 22. In the pivoting process of the rotating element 22, the elastic element 214 and the positioning member 215 are moved while the pivoting portion is rotated, and are rotated and moved with respect to the containing portion 213. In the rotating process, the elastic element 214 applies a force to the positioning member 215, such that the positioning member 215 abuts the containing portion 213 to produce a friction, and the rotating element 22 can be maintained at a positioning angle during the rotating process and allow users to have a hand feel of the friction. Therefore, the users will not apply a too-large force to the rotating element 22 or touch the rotating element 22 by mistake to produce a shaking. If the users stop applying force to the pressing member 231, the elastic member 232 is no longer pressed, and thus the elastic potential energy is released to resume the original status and drive the pressing member 231 back to its original position.

If a user wants to fold the stand module 2, the user simply presses the positioning portion 221 to move it towards the folding direction of the engaging portion 212. When a side of the positioning portion 221 is embedded into the slot 212a of the engaging portion 212, the positioning member 215 is slid and limited into the position limit hole 213b to further fix the rotating element 22.

In addition, the engaging portion 212 can be made of a magnetic material and attached to the positioning portion 221 to prevent the positioning portion 221 from being loosened or separated from the engaging portion 212.

In summation of description above, a digital mobile device and a stand module thereof in accordance with the present invention achieves an effect of abutting the positioning member by the elastic element, such that the positioning member can produce a friction to the containing portion, and a user can have a hand feel of the friction when the user operates the stand module to hold the rotating element and the positioning element at a fixed angle, so as to prevent the rotating element from being shaken and avoid the situation of unable to securely support the digital mobile device.

The digital mobile device and the stand module thereof in accordance with the present invention achieves another effect of using a pressing member to abut the press portion to warp the positioning portion outward, so as to facilitate users to rotate the rotating element.

While the invention has been described by means of specific embodiments, numerous modifications and variations could be made thereto by those skilled in the art without departing from the scope and spirit of the invention set forth in the claims.

What is claimed is:

1. A stand module, applicable to a digital mobile device, comprising:
    a fixing element, disposed on a side of the digital mobile device, comprising:
        an elastic element;
        a positioning member, disposed on a side of the elastic element; and
        a groove;
    a pressing element, disposed into the groove; and
    a rotating element, pivotally coupled to the fixing element, comprising a positioning hole, and the elastic element and the positioning member being disposed in the positioning hole;
    wherein if the rotating element is rotated with respect to the fixing element, the elastic element will compress the positioning member to abut the fixing element, such that the fixing element and the rotating element are maintained at a positioning angle;
    wherein the fixing element includes an engaging portion and a containing portion, and the rotating element includes a positioning portion and a pivoting portion, and the pivoting portion is embedded into the containing portion;
    wherein the pressing element includes a pressing member and an elastic member, and the pivoting portion includes a pressing surface corresponding to the pressing member.

2. The stand module of claim 1, wherein the fixing element further includes a pivoting element for pivotally coupling the containing portion and the pivoting portion.

3. The stand module of claim 2, wherein the containing portion includes a first pivot hole, and the pivoting portion includes a second pivot hole, and the pivoting element is inserted into the first pivot hole and the second pivot hole.

4. The stand module of claim 3, wherein the pivoting element includes a screw portion screwed to the containing portion.

5. The stand module of claim 1, wherein the pressing member will abut the pressing surface to drive the pivoting portion and the positioning portion to warp and rotate outwardly if the pressing member is forced to move in a direction towards the groove, such that the positioning portion and the fixing element form an angle.

6. The stand module of claim 5, wherein the pressing member includes a plurality of latch pins latched to the groove.

7. The stand module of claim 1, wherein the pivoting portion further includes a stop unit disposed on one side of the pivoting portion, such that if the rotating element is rotated to a predetermined angle, the stop unit will abut the containing portion.

8. The stand module of claim 1, wherein the fixing element further comprises a plurality of positioning pins, each positioning pin having a hole for passing a locking element to fix the fixing element and the digital mobile device.

9. The stand module of claim 1, wherein the engaging portion is a magnetic element, and the engaging portion is attached and fixed to the positioning portion.

10. The stand module of claim 1, wherein the containing portion further includes a position limit hole, such that if the positioning portion is attached to the engaging portion, the positioning member will be limited into the position limit hole.

11. The stand module of claim 1, wherein the elastic element is a spring.

12. The stand module of claim 1, wherein the elastic member is a spring.

13. A digital mobile device, comprising:
    a stand module, including:
        a fixing element, disposed on a side of the digital mobile device, and including:
            an elastic element;
            a positioning member, disposed on a side of the elastic element; and
            a groove;
        a pressing element, disposed into the groove; and
        a rotating element, pivotally coupled to the fixing element, comprising a positioning hole, and the elastic element and the positioning member being disposed into the positioning hole;
    wherein if the rotating element is rotated with respect to the fixing element, the elastic element will compress the positioning member to abut the fixing element, such that the fixing element and the rotating element are maintained at a positioning angle;
    wherein the fixing element includes an engaging portion and a containing portion, and the rotating element includes a positioning portion and a pivoting portion, and the pivoting portion is embedded into the containing portion;
    wherein the pressing element includes a pressing member and an elastic member, and the pivoting portion includes a pressing surface corresponding to the pressing member.

14. The digital mobile device of claim 13, wherein the fixing element further includes a pivoting element pivotally coupled to the containing portion and the pivoting portion.

15. The digital mobile device of claim 14, wherein the containing portion includes a first pivot hole, and the pivoting portion includes a second pivot hole, and the pivoting element is inserted into the first pivot hole and the second pivot hole.

16. The digital mobile device of claim 15, wherein the pivoting element includes a screw portion screwed to the containing portion.

17. The digital mobile device of claim 13, wherein the pressing member will abut the pressing surface to drive the pivoting portion and the positioning portion to warp and rotate outwardly if the pressing member is forced to move in a direction towards the groove, such that the positioning portion and the fixing element form an angle.

18. The digital mobile device of claim 17, wherein the pressing member includes a plurality of latch pins latched to the groove.

19. The digital mobile device of claim 13, wherein the pivoting portion further includes a stop unit disposed on one side of the pivoting portion, such that if the rotating element is rotated to a predetermined angle, the stop unit will abut the containing portion.

20. The digital mobile device of claim 13, wherein the fixing element further comprises a plurality of positioning pins, each positioning pin having a hole for passing a locking element to fix the fixing element and the digital mobile device.

21. The digital mobile device of claim 13, wherein the engaging portion is a magnetic element, and the engaging portion is attached and fixed to the positioning portion.

22. The digital mobile device of claim 13, wherein the containing portion further includes a position limit hole, such that if the positioning portion is attached to the engaging portion, the positioning member will be limited in the position limit hole.

23. The digital mobile device of claim 13, wherein the elastic element is a spring.

24. The digital mobile device of claim 13, wherein the elastic member is a spring.

* * * * *